C. E. HUNDLEY.
DRAFT ATTACHMENT.
APPLICATION FILED APR. 16, 1920.
1,363,791.
Patented Dec. 28, 1920.
FIG_1_
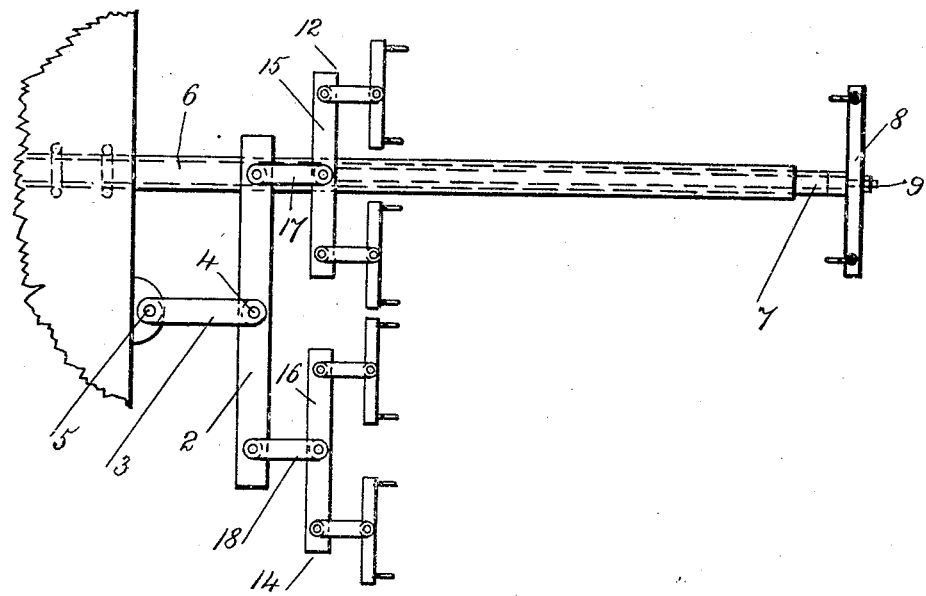
FIG_2_
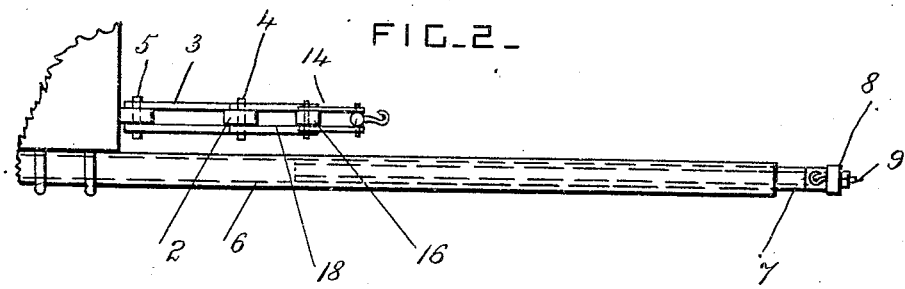
Inventor.
Charles E. Hundley
by Herbert W. T. Jenner
Attorney.

UNITED STATES PATENT OFFICE.

CHARLES E. HUNDLEY, OF OLNEY, ILLINOIS.

DRAFT ATTACHMENT.

1,363,791.  Specification of Letters Patent.  Patented Dec. 28, 1920.

Application filed April 16, 1920. Serial No. 374,347.

*To all whom it may concern:*

Be it known that I, CHARLES E. HUNDLEY, a citizen of the United States, residing at Olney, in the county of Richland and State of Illinois, have invented certain new and useful Improvements in Draft Attachments, of which the following is a specification.

This invention relates to draft attachments for gang plows and other similar agricultural implements or machines; and it consists in the novel construction and combination of the parts hereinafter fully described and claimed.

In the drawings, Figure 1 is a plan view of a draft attachment constructed according to this invention. Fig. 2 is a side view of the same.

A crossbar 2 is pivoted at its middle part to the gang plow or other load to be drawn along by means of a link or bar 3. This crossbar is free to oscillate on its pin 4, and the link is pivoted to the load by a pin 5 but may be otherwise connected to it. A tubular shaft or main draft pole 6 is secured to the load to one side of the link 3. This main draft pole 6 is formed of a cylindrical metallic tube, and it is arranged normally parallel to the bar or link 3. An extension draft pole 7 is slidable longitudinally, and is also revoluble, in the tubular draft pole 6, and a neck-yoke 8 is secured to its front end by a longitudinal bolt 9. The extension draft pole 7 is also preferably tubular, and it is arranged to slide very freely in the main draft pole 6. The bolt 9 is arranged axially of the draft pole 7, so that the neck-yoke bears against its front end.

Two two-horse eveners 12 nd 14 are provided, and their cross-pieces 15 and 16 are pivoted to the end portions of the crossbar 2 by links 17 and 18 respectively. The evener 12 is arranged crosswise of and above the main draft pole 6, so that the two animals connected to it are arranged one on each side of the draft pole, and are suitably harnessed to the neck-yoke.

When the switch team, which is connected to the evener 14, lags behind, the extension draft pole 7 slides forwardly in the main tubular draft pole to the required distance. The neck-yoke is fastened to the extreme end of the extension draft pole with the advantage of having no portion of the pole projecting in advance of the neck-yoke as in devices of this sort as ordinarily constructed. When the end portion of the draft pole projects beyond the neck-yoke it is liable to catch in fences and other places and get broken.

What I claim is:

In a draft attachment, a main draft pole rigidly secured to the load, an extension draft pole slidable telescopically of the main draft pole, a link arranged to one side of the main draft pole and having its rear end portion pivoted to the load, a crossbar having its middle portion pivoted to the front end portion of the said link with one of its end portions overlapping the main draft pole, two two-horse eveners connected to the end portions of the said crossbar, and a neck-yoke attached to the extension draft pole and adapted to slide forwardly when the switch team lags behind the team which is harnessed to the said neck-yoke and to the evener which overlaps the main draft pole.

In testimony whereof I have affixed my signature.

CHARLES E. HUNDLEY.